(12) United States Patent
Phatigaraphong et al.

(10) Patent No.: US 11,296,894 B2
(45) Date of Patent: Apr. 5, 2022

(54) STORAGE MEDIUM INCLUDING COMPUTING CAPABILITY FOR AUTHENTICATION

(71) Applicant: Seagate Technology LLC, Cupertino, CA (US)

(72) Inventors: Simon Thavatchai Phatigaraphong, Pomona, CA (US); Rupasree Roy, Milpitas, CA (US); Manuel Alexander Offenberg, South Lake Tahoe, CA (US)

(73) Assignee: Seagate Technology LLC, Fremont, CA (US)

( * ) Notice: Subject to any disclaimer, the term of this patent is extended or adjusted under 35 U.S.C. 154(b) by 576 days.

(21) Appl. No.: 16/174,113

(22) Filed: Oct. 29, 2018

(65) Prior Publication Data
US 2020/0136837 A1 Apr. 30, 2020

(51) Int. Cl.
*H04L 9/32* (2006.01)
*H04L 9/08* (2006.01)
*G06F 21/44* (2013.01)

(52) U.S. Cl.
CPC .......... *H04L 9/3268* (2013.01); *H04L 9/0897* (2013.01); *G06F 21/44* (2013.01)

(58) Field of Classification Search
CPC ... H04L 9/3268; H04L 9/0897; H04L 63/123; H04L 2209/38; H04L 9/3239; G06F 21/44; G06F 21/64
See application file for complete search history.

(56) References Cited

U.S. PATENT DOCUMENTS

| | | | |
|---|---|---|---|
| 9,887,975 B1* | 2/2018 | Gifford | H04L 63/126 |
| 2005/0171904 A1* | 8/2005 | Yacobi | G06Q 20/29 705/40 |
| 2010/0217977 A1* | 8/2010 | Goodwill | G06F 21/78 713/167 |
| 2016/0261411 A1* | 9/2016 | Yau | H04L 63/0869 |
| 2016/0275461 A1* | 9/2016 | Sprague | H04L 9/3234 |
| 2017/0352012 A1* | 12/2017 | Hearn | G06Q 50/18 |
| 2017/0357970 A1* | 12/2017 | Muftic | G06Q 20/26 |
| 2018/0068130 A1 | 3/2018 | Chan et al. | |
| 2018/0083932 A1 | 3/2018 | Adams | |
| 2018/0130050 A1 | 5/2018 | Taylor et al. | |
| 2018/0254898 A1* | 9/2018 | Sprague | H04L 9/3271 |
| 2019/0121988 A1* | 4/2019 | van de Ruit | H04L 9/0825 |
| 2019/0268141 A1* | 8/2019 | Pandurangan | H04L 9/0637 |
| 2019/0349426 A1* | 11/2019 | Smith | H04W 84/22 |

(Continued)

OTHER PUBLICATIONS

Nicole Sioni. "Guide to Storing Bitcoin and Cryptocurrencies on USB Devices" Published Jan. 4, 2018 (8 pages) https://www.premiumusb.com/blog/guide-to-storing-bitcoin-and-cryptocurrencies-on-usb-devices (Year: 2018).*

(Continued)

*Primary Examiner* — Fatoumata Traore
*Assistant Examiner* — Thomas A Gyorfi
(74) *Attorney, Agent, or Firm* — Mueting Raasch Group

(57) ABSTRACT

A method includes generating a private key associated with a distributed ledger. The private key is stored on a secure memory. A storage device is manufactured and includes an onboard computing device having the secure memory integrated therein. The onboard computing device is configured to sign one or more ledger operations with the private key.

21 Claims, 6 Drawing Sheets

(56) References Cited

U.S. PATENT DOCUMENTS

2019/0354970 A1* 11/2019 Di Iorio ............. G06Q 20/3823
2019/0378134 A1* 12/2019 Asari ................. G06Q 20/3825

OTHER PUBLICATIONS

"How Hardware Wallets Actually Work" Published Mar. 22, 2018 (6 pages) https://myhardwarewallet.co.uk/how-hardware-wallets-actually-work/ (Year: 2018).*

Eric Larcheveque. "Ledger 101—Part 2: Why are Hardware Wallets Secure?" Published Oct. 10, 2018 (7 pages) https://medium.com/ledger-on-security-and-blockchain/ledger-101-part-2-why-hardware-wallets-are-secure-9e9982c144ab (Year: 2018).*

Chao Qu et al. "Blockchain Based Credibility Verification Method for IoT Entities" Security, Privacy, an Trust for Cyberphysical-Social Systems, Published Jun. 27, 2018 (19 pages) https://www.hindawi.com/journals/scn/2018/7817614 (Year: 2018).*

\* cited by examiner

STORAGE MEDIUM INCLUDING COMPUTING CAPABILITY FOR AUTHENTICATION

SUMMARY

Provided herein is a method that includes generating a private key associated with a distributed ledger. The private key is stored on a secure memory. A storage device is manufactured and includes an onboard computing device having the secure memory integrated therein. The onboard computing device is configured to sign one or more ledger operations with the private key.

These and other features and advantages will be apparent from a reading of the following detailed description.

DESCRIPTION

Figure 1:
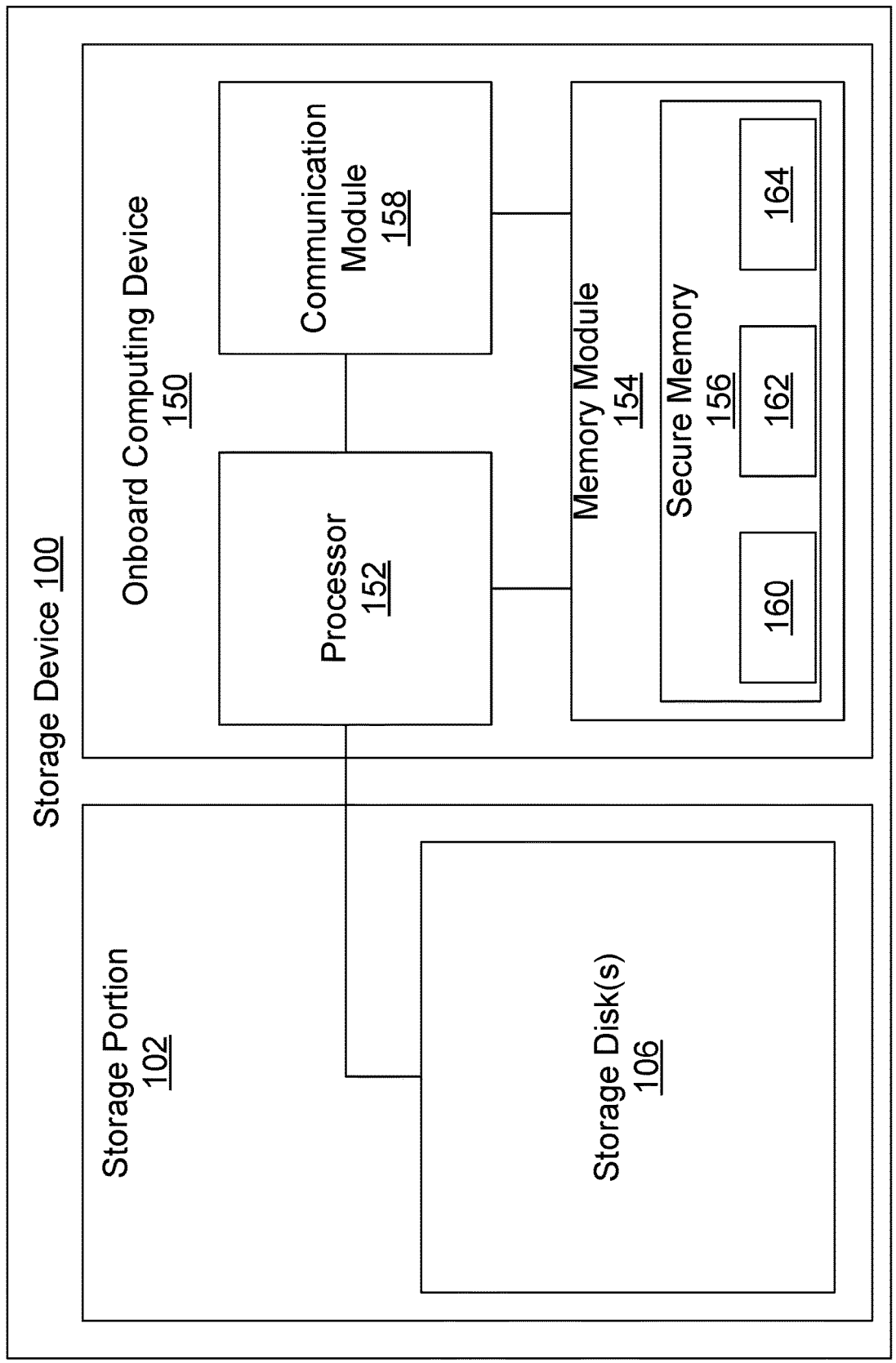
FIG. 1 shows a block diagram of a storage device including a computing device formed integrally therewith, in accordance with some embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "decrypting," "encrypting," "processing," "updating," "instantiating," "communicating," "comparing," "erasing," "issuing," "locking," or the like, refer to actions and processes of a computer system or similar electronic computing device, a storage device, or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, storage device, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

There has been a growing need for providing data security and tracking of authenticity of storage devices independent of the systems in which the storage devices are used. For example, a need has arisen to verify provenance of storage devices and allow storage devices to participate directly in distributed ledger tracking schemes. A storage device capable of independent processing, authentication, and other functions has become more important, given an increase in data security breaches, and other data theft scenarios.

Moreover, an ever increasing use of sensitive data, e.g., corporate, military, legal, etc., has increased the need to track integrity and authenticity of storage devices. Thus, there is a need for onboard computing on a storage device to allow the storage device itself to participate in security schemes using a distributed ledger.

It is appreciated that while embodiments are described with respect to a storage device and in particular a hard drive or Solid State Drive (SSD), the embodiments are not limited thereto. For example, the embodiments are equally applicable to other electronic devices, e.g., non-storage devices.

Referring now to FIG. 1, a storage device 100 having an onboard computing device 150 is shown, according to one aspect of the present embodiments. The storage device 100 generally includes a storage portion 102 including one or more data storage disks 106 of computer-readable data storage media. Typically, both of the major surfaces of each data storage disk 106 include a plurality of concentrically disposed tracks for data storage purposes. Multiple data storage disks 106 are typically mounted in vertically spaced and parallel relation on a hub. A spindle motor rotates the data storage disks 106. In other embodiments, the storage portion 102 includes a solid-state storage element, such as a flash memory element (not shown). Although example storage devices 100 including storage disks 106 are discussed herein, it will be appreciated that the storage portion can include any suitable storage element.

The storage portion 102 further includes a mechanism for reading and/or writing to one or more of the storage disks 106, including an actuator arm assembly that pivots about a pivot bearing, one or more individual rigid actuator arms, control electronics such as integrated circuits coupled to a printed circuit board, and/or any other suitable mechanisms for allowing reading and/or writing of the storage disks 106.

In some embodiments, the storage device 100 includes an onboard computing device 150 formed integrally therewith. The onboard computing device 150 includes a processor 152, one or more memory modules 154, and/or any other suitable computing components. In some embodiments, the one or more memory modules 154 are different, and can be isolated from, the storage disks 106 and/or a portion of the storage disks 106 can define at least one of the memory modules 154. In some embodiments, the onboard computing device 150 is configured to allow the storage device 100 to execute one or more programs independent from and/or in conjunction with a processor of a system into which the storage device 100 is installed (not shown). For example, and as discussed in greater detail below, in some embodiments the onboard computing device 150 enables the storage device 100 to participate in a distributed ledger (or blockchain) as a peer, a client to one or more peers, a node implementing one or more consensus mechanisms, a credentials issuing authority, etc.

In some embodiments, the processor 152 includes a general purpose processor, a chip multiprocessor (CMP), a microprocessor such as a complex instruction set computer (CISC) microprocessor, a reduced instruction set computing (RISC) microprocessor (such as an advanced RISC Machine (ARM) processor), and/or a very long instruction word (VLIW) microprocessor, or other processing device. In some embodiments, the processor 152 is configured to implement an operating system 164, such as, for example, a device proprietary, a Linux-based, Unix-based, and/or other operating system. The operating system 164 and/or the processor 152 may be configured to implement one or more predetermined programs, or code modules, such as a container module (e.g., docker container), chain code containers, blockchain specific modules, and/or any other code modules.

In some embodiments, the one or more memory modules 154 include a secure memory 156, e.g., a read only memory (ROM), that is accessible only by the processor 152 of the onboard computing device 150. The secure memory 156 is a secure data repository that is configured to store one or more data elements for use by the onboard computing device 150. For example, in some embodiments, the secure memory 156 is configured to store one or more data files, such as a private key 160 associated with the storage device 100 (for use in distributed ledger transactions as discussed in greater detail below), a distributed ledger program 162, an operating system 164, and/or any other suitable secure files. The secure memory 156 can be isolated from and/or inaccessible to a system in which the storage device 150 is installed. In some embodiments, the secure memory 156 includes a one-time programmable memory component and/or read-only memory component(s). It is appreciated that in some embodiments, a certificate authority (also referred to as credentials issuing authority) associated with a ledger/blockchain may transmit a key to the storage device 100. The key enables the storage device 100 to participate in the blockchain/ledger, block creation, and/or ledger storage thereof. In some embodiments, the secure memory can include a second private key (or signing element) It is appreciated that in some embodiments, the second private key be a unique key associated with the storage device 100 that has been stored thereon at the time of manufacturing the storage device 100.

The onboard computing device 150 may use the second key that is unique to the storage device 100 and that has or has not been transmitted to the storage device 100 to sign a block of the blockchain, thereby creating a unique signature for the generated block of the blockchain. Thus, each block can uniquely identify the device that generated the block and therefore its authenticity can be verified.

In some embodiments, the onboard computing device 150 includes a communications module 158 configured to couple the onboard computing device 150 to one or more networks and/or additional devices. The communications module 158 may comprise the appropriate physical connectors to connect with a corresponding communications medium, whether wired or wireless, such as a wired and/or wireless network. In various aspects, the network may comprise local area networks (LAN) as well as wide area networks (WAN) including without limitation Internet, wired channels, wireless channels, etc. Accordingly, in various aspects, the communications module 158 may comprise one or more interfaces such as, for example, a wireless communications interface, a wired communications interface, a network interface, a transmit interface, a receive interface, a system interface, a component interface, a switching interface, a chip interface, a controller, and so forth. It is appreciated that while the embodiments are described with respect to networked enabled storage devices, the embodiments should not be construed as limited thereto. For example, storage devices without network capability can be used.

In some embodiments, the onboard computing device 150 is configured to access data stored on the storage disks 106. For example, in some embodiments, the onboard computing device 150 is configured to perform one or more read/write operations to the storage disks 106. The onboard computing device 150 may be configured to access predetermined portions of the storage disks 106 and/or may be configured to access any portion of the storage disks 106.

In some embodiments, the onboard computing device 150 uses a stored private key 160 and the communications module 158 to perform one or more transactions (e.g., operations) on a distributed ledger. It is appreciated that the use of the stored private key 160 is referring to use of the key associated with the public key from the certificate issued by the issuing authority to participate in the distributed ledger while using a second private key and its associated public key that is unique to the device and that is not transmitted to the device to cryptographically sign blocks of the blockchain. The stored private key 160 therefore is referring to two keys, a first key that is being securely transmitted by the issuing authority and a second key that is not transmitted but is rather unique and resident on the storage device 100.

According to some embodiments, the certificate issued by the issuing authority associates a public key to the identity of an electronic device, therefore binding the public key to a private key of the electronic device. The private key may be the stored private key 160 of the onboard computing device 150 and it is associated with a corresponding public key, as indicated by the certificate. The certificate therefore binds the public key to the onboard computing device 150. In other words, the certificate binds the public key to the identity of the onboard computing device 150.

The computing device 150 may be configured as a peer, a client, and/or a node implementing one or more consensus mechanisms of a distributed ledger. For example, in embodiments in which the onboard computing device 150 is a peer, the onboard computing device 150 includes a copy of the blockchain or distributed ledger. The processor 152 is configured to execute a blockchain program (for example, a program stored on the memory module 154) to generate new blocks, verify existing blocks, and/or process one or more programs (e.g., smart contracts) stored on the blockchain. The onboard computing device 150 uses the private key 160 to sign each generated block and/or verification message. In some embodiments, the onboard computing device 150 uses the communications module 158 to transmit and/or receive updates to the stored blockchain. In other embodiments, the onboard computing device 150 uses the system containing the storage device 100 to transmit and/or receive updates to the blockchain. The private key 160 allows the processor 152 to sign each transaction with a cryptographic signature that provides assurance and validation that the request is generated by the specific storage device 100 containing the private key 160.

As another example, in some embodiments, the onboard computing device 150 is configured to operate as a client of a distributed ledger. The processor 152 is configured to execute a client blockchain (or ledger) program (for example, a program stored on the memory module 154) to generate and transmit transaction requests and/or queries for one or more peers of the distributed ledger. The transaction requests can include requests for validation of data on the blockchain, a request to execute a transaction, and/or any other suitable request. The onboard computing device 150 is configured to sign each generated transaction request with the private key 160 stored in the secure memory 156. The private key 160 allows the processor 152 to sign each request with a cryptographic signature that provides assurance and validation that the transaction request is generated by the specific storage device 100 containing the private key 160.

In some embodiments, the onboard computing device 150 and the private key 160 enable the storage device 100 to perform one or more operations using a distributed ledger, such as, for example, ownership and/or custody tracking, device life-cycle, integrity verification, firmware validation, and/or any other suitable operations. For example, in some embodiments, a distributed ledger is updated when the storage device 100 is manufactured. The distributed ledger may include information regarding the storage device 100, such as date of manufacture, serial number, etc. The onboard computing device 150 may generate ledger transactions using the private key 160 to obtain information from the distributed ledger, update the distributed ledger, and/or perform other ledger transactions for tracking, verifying, and/or otherwise validating the storage device 100. It is appreciated that ownership and/or custody tracking, integrity verification, firmware validation, device life-cycle, etc. may be generally referred to as device state information.

As one example, in some embodiments, the onboard computing device 150 is configured to communicate with one or more peers to verify authenticity of the storage device 100 when the storage device 100 is installed in a system. The onboard computing device 150 can generate a query to the distributed ledger to request information regarding the storage device 100. The request is signed using the private key 160 stored in the secure memory 156 and is generated solely by the onboard computing device 150. The onboard computing device 150 receives information about the storage device 100 from the distributed ledger and compares the received information to information obtained from the storage device 100. If the information matches, the onboard computing device 150 verifies and/or validates the storage device 100. If the information does not match, the onboard computing device 150 may indicate an error and/or identify tampering with respect to the storage device 100. It will be appreciated that the onboard computing device 150 can be configured to perform any suitable operations on the distributed ledger, such as, for example, provenance verification, life-cycle state updates, and/or other operations, as discussed in greater detail herein. It is appreciated that ownership and/or custody tracking, integrity verification, firmware validation, device life-cycle, etc. may be generally referred to as device state information.

It is appreciated that the storage device as described above enables a smart contract to execute on the device by reading and manipulating the ledger. For example, the smart contract executing on the storage device can add to the ledger. It is appreciated that the smart contract refers to an executable code with input and output that runs on a virtual machine or on the local processor of the storage device.

Figure 2:
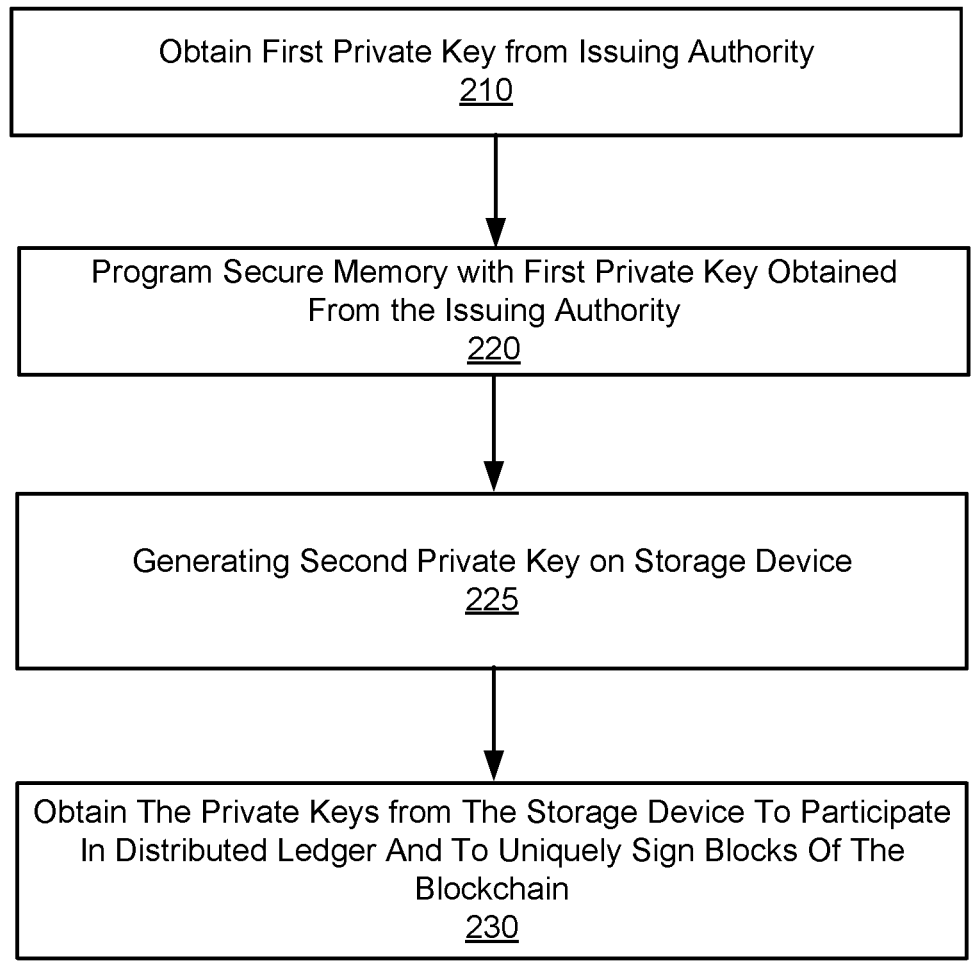
FIG. 2 shows a method of obtaining and storing a private key on a storage device including an onboard computing device, in accordance with some embodiments.

FIG. 2 shows a method 200 of obtaining and storing a private key on a storage device including an onboard computing device, in accordance with some embodiments. It is appreciated that the storage device 100 may securely receive credentials from a issuing authority that includes a key enabling the storage device 100 to participate in a distributed ledger. The storage device 100 may also include a second private key stored as the private key 160, which is unique to the storage device 100 and may be used by the storage device 100 to sign a block of the blockchain.

In other words, the private key 160 includes two different private keys, one securely received from the issuing authority and another key that is unique to the storage device 100 that is stored thereon during manufacturing of the storage device 100. The first private key can include a cryptographic key associated with a distributed ledger (i.e. key from the ledger). The second private key can include a value and/or cryptographic key generated by the storage device 100. As discussed in further detail below, a private key 160 may be used by a storage device 100 to sign one or more distributed ledger operations, requests, etc. The storage device 100 can be configured to use a first private key to participate in the distributed ledger system while using a second private key to sign distributed ledger operations. It will be appreciated that the embodiments discussed herein including signature by a private key 160 include embodiments using the first private key, the second private key, or the combination of the first private key and the second private key.

At step 210, a key is securely obtained from an issuing authority for a selected distributed ledger. For example, the key is obtained from a certificate being issued by the issuing authority. For example, in some embodiments, the cryptographic key is associated with a private, semi-private, or public permissioned ledger having a node implementing one or more consensus mechanisms or issuing authority authorized to issue private/public key pairs for the permissioned ledger. The permissioned ledger may include any suitable ledger, such as a proprietary ledger, an open source ledger (e.g., Hyperledger Fabric), and/or any other suitable permissioned ledger. In some embodiments, the private key is associated with a public distributed ledger, such as Ethereum, Bitcoin, etc. that allows any entity to obtain private/public key pairs and participate in the blockchain. Thus, the storage device 100 is enabled to participate in a distributed ledger.

At step 220, the private key issued by the issuing authority is programmed onto secure memory 156 to enable the storage device 100 to participate in the distributed ledger. The secure memory 156 can include a blank storage device and/or a previously programmed storage device. In some embodiments, a second private key of the private key 160 is generated and programmed onto the secure memory 156 by a single device, such that the private key 160 is not subject to transmission over any data networks. For example, the manufacturer of the storage device 100 may maintain a private (or semi-private) distributed ledger. The manufacturer can have one or more devices located locally and/or integrated with a manufacturing system for a storage device 100. The one or more devices implement a certificate of authority (or other secure element) that allows the device to generate a private key 160 for use on the private distributed ledger. One of the one or more devices generate a private key 160, which is immediately transferred to a secure memory 156 to be integrated with a manufactured storage device 100. Because the private keys are generated locally and securely, theft and/or accidental loss of the private keys is prevented. In other embodiments, the secure memory 156 is programmed with a private key 160 obtained from a remote issuing authority and transmitted to a device over a secure transmission channel. The secure memory 156 is in signal communication with a processor 152 of the onboard computing device 150. In some embodiments, the secure memory 156 is isolated from one or more additional components of the storage device 100.

At optional step 225, a second cryptographic key is generated by the onboard computing device 150. The second cryptographic key can be stored in secure memory 156 and/or stored in a memory module separate from the secure memory 156.

At step 230, the first private key 160 and/or the second private key is obtained by the computing device 150 from the secure memory 156. Thus, the storage device 100 can participate in the distributed ledger and is configured to uniquely sign blocks of the blockchain.

Figure 3:
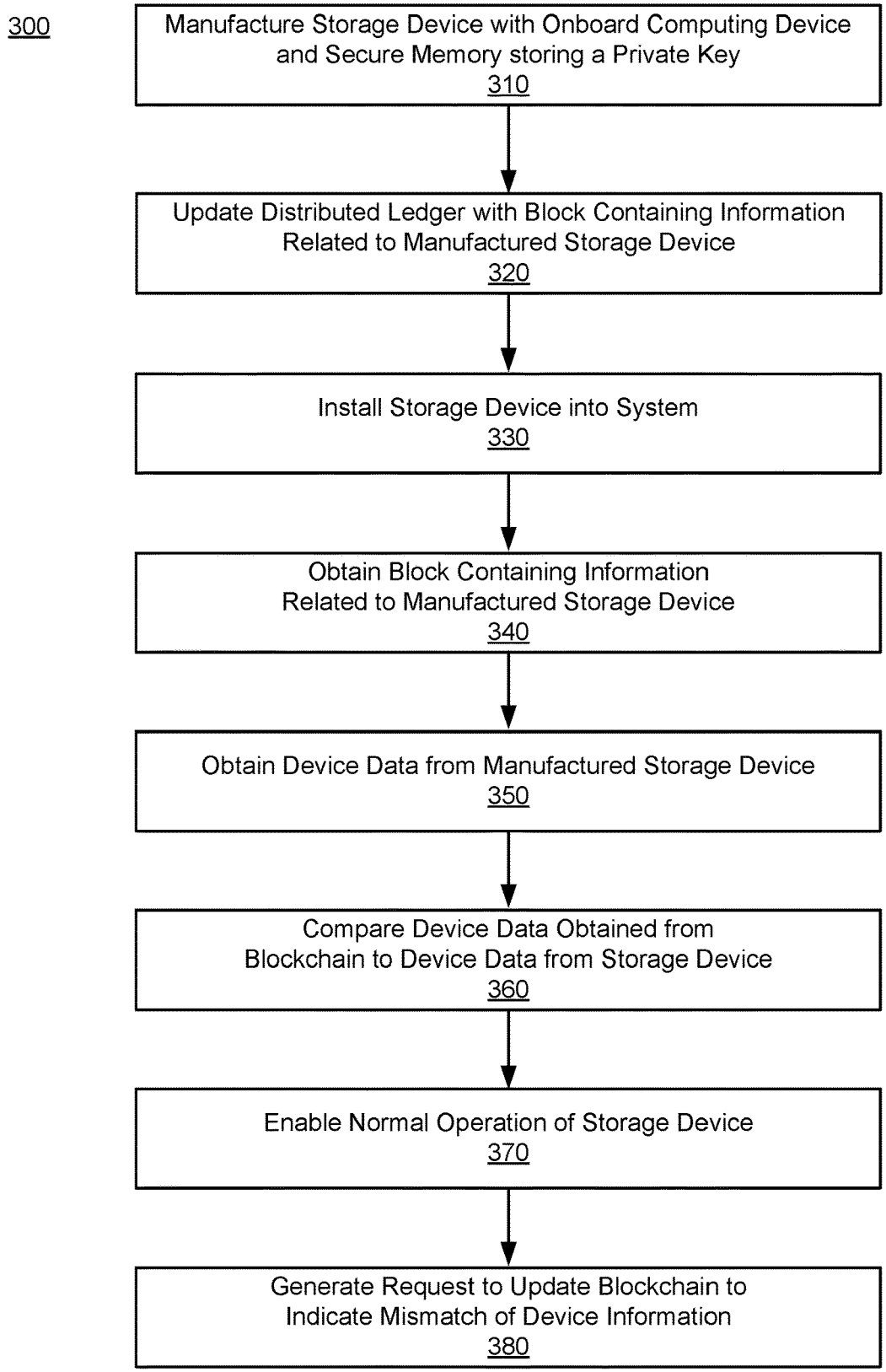
FIG. 3 shows a method of verifying a storage device using a private key maintained by an onboard computing device, in accordance with some embodiments.

FIG. 3 illustrates a method 300 of using a private key 160 maintained by an onboard computing device 150 to track and verify authenticity of a storage device 100, in accordance with some embodiments. At step 310, a storage device 100 including an onboard computing device 150 and a private key 160 is manufactured, for example, according to the method 200 discussed above. The private key 160 is maintained by secure memory 156. It is appreciated that the private key 160 is referring to two keys, one associated with the certificate being issued by the issuing authority and another key resident on the storage device 100 at the time of manufacturing or generated by the storage device 100 in a secure manner after the storage device 100 is manufactured. Optionally, a certificate is generated for the public key associated with second private key by a manufacturing certificate issuing authority or a third-party certificate authority issuing certificates on behalf of the manufacturer.

At step 320, a selected distributed ledger is updated to indicate manufacture of the storage device 100. The distributed ledger may be updated by any suitable system, such as, for example, a device formed integrally with the manufacturing process, the onboard computing device 150, a distributed ledger ordering device, and/or any other suitable device. The distributed ledger may be updated to include a new block containing data indicative of the manufactured storage device 100, such as, for example, date of manufacture, serial number, firmware revision number, model number, size, and/or any other suitable information. The block is appended to the blockchain of the distributed ledger and is transmitted to each peer in the distributed ledger for validation and/or storage. It is appreciated that the block may be generated and cryptographically signed using the private key unique to the storage device 100. The key from the certificate is used to enable the storage device 100 to participate in the distributed ledger.

At step 330, the storage device 100 is installed into a system and/or otherwise activated and the storage device 100 executes a validation routine. The storage device 100 provides power to the onboard computing device 150, which is configured to perform a validation operation. At step 340, the onboard computing device 150 accesses the blockchain and obtains a block containing the data indicative of the storage device 100. The onboard computing device 100 may retrieve the block and/or data from an internal copy of the blockchain (e.g., the onboard computing device 150 is a peer in the blockchain), based on a request to one or more peers of the distributed ledger, and/or according to any other suitable method.

At step 350, the onboard computing device 150 obtains device data directly from the storage device 100. For example, the onboard computing device 150 may be in signal communication with a non-volatile memory (such as read-only memory) containing information regarding the storage device 100. The storage device information may include information similar to that stored on the blockchain, such as date of manufacture, serial number, model number, size, etc. In some embodiments, the storage device information is maintained by secure memory 156.

At step 360, the onboard computing device 150 compares the device data obtained from the blockchain to the device data obtained from the storage device 100. If the data matches (e.g., same serial number, same date of manufacture, same firmware version, etc.), the storage device 100 is validated and approved for use. The method 300 proceeds to step 370 and normal operation of the drive is enabled. If the device data obtained from the blockchain and the device data obtained from the storage device 100 is different, the onboard computing device 150 indicates an error and/or identifies potential tampering with respect to the storage device 100.

At step 380, the onboard computing device 150 generates a request to update (or directly updates) the blockchain to indicate that the device information of the storage device 100 does not match the device information maintained on the blockchain. Updating the blockchain to indicate a mismatch in the storage device information may allow the blockchain (or one or more systems operating on the blockchain) to identify failed/failing drives, lost or stolen drives, counterfeit drives, etc. In some embodiments, the onboard computing device 150 updates the blockchain without notifying the system in which the storage device 100 has been installed. It is appreciated that the private key unique to the storage device 100 is used to cryptographically sign the generated block and to update the ledger.

Figure 4:
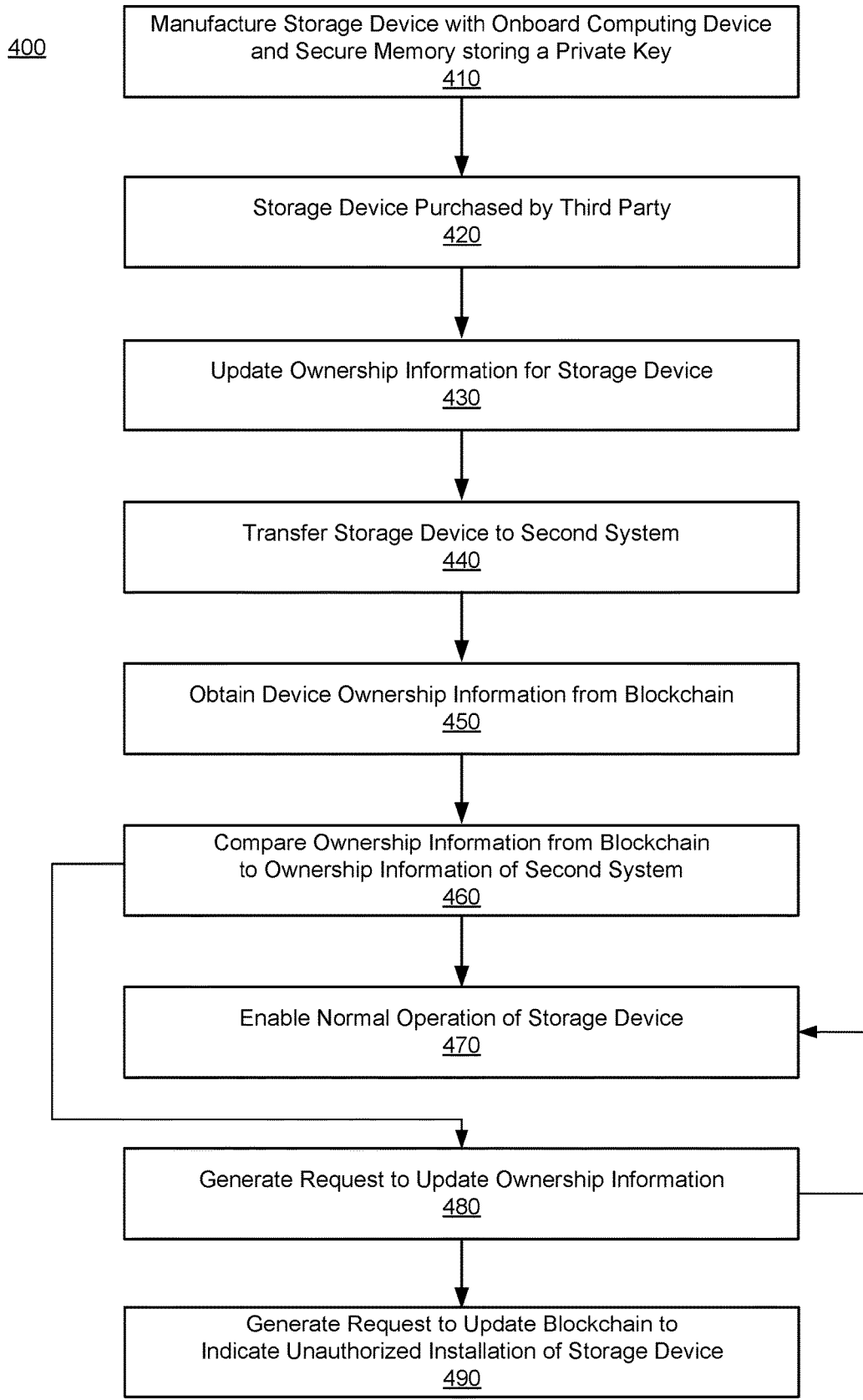
FIG. 4 shows a method of tracking life cycle state of a storage device using a private key maintained by an onboard computing device, in accordance with some embodiments.

FIG. 4 illustrates a method 400 of tracking life-cycle state or ownership of a storage device 100 using an onboard computing device 150 configured to maintain a private key 160 stored on a secure memory 156, in accordance with some embodiment. At step 410, a storage device 100 including an onboard computing device 150 and a private key 160 is manufactured, for example, according to the method 200 discussed above.

At step 420, the storage device 100 is purchased by a third party (e.g., a purchaser) and the blockchain is updated to indicate the new ownership of the storage device 100. For example, in some embodiments, the onboard computing device 150 executes one or more processes to obtain information regarding the purchaser after the storage device 100 is installed into a first system. The onboard computing system 150 may operate in conjunction with the first system to prompt a user to enter ownership information and/or may obtain the ownership information from the first system directly. At step 430, the onboard computing device 150 generates a request to update the blockchain and/or generates a block to be appended to the blockchain. The request/block is signed by the onboard computing device 150 using the private key 160 maintained in secure memory 156. As another example, in some embodiments, the manufacturer and/or the third-party purchaser update the blockchain at the time of purchase using one or more other systems.

At step 440, the storage device 100 is transferred to a second system. The second system may be a system associated with the original third-party purchaser and/or a new owner. After the storage device 100 is installed in the second system, the onboard computing device 150 is configured to verify ownership of the storage device 100. At step 450, the onboard computing device 150 generates a query to the blockchain (e.g., queries one or more peers of the blockchain) to obtain information including ownership information for the storage device 100. The generated query is signed using the private key 160 maintained in secure memory 156. At step 460, the ownership information stored on the blockchain is compared to the owner of the new system. If the ownership information stored on the blockchain and the owner of the new system match, the method 400 proceeds to step 470 and normal operation of the storage device is enabled. If the ownership information stored on the blockchain and the owner of the new system do not match, the method proceeds to step 470.

At step 480, the onboard computing device 150 is configured to generate a request to the distributed ledger to update the ownership status. The request may include a smart contract and/or other ledger-implementable program that is configured to request an update of the current ownership status of the storage device 100. The request is signed using the private key 160 maintained by secure memory 156. If the request is successful, the method 400 proceeds to step 470 and normal operation of the device is enabled. For example, in some embodiments, the distributed ledger may request the prior owner and/or a device manufacturer to verify the new owner/ownership status of the storage device 100. If the ownership is not updated, the method 400 proceeds to step 490 and the onboard computing system 150 generates a request to update the blockchain to indicate an unauthorized installation of the storage device 100. The request is signed with the private key 160 maintained by secure memory 156. The onboard computing system 150 may further prevent operation of the storage device 100 until the ownership status maintained by the blockchain is updated to match the owner of the second system.

It is appreciated that the method, as described in FIG. 4, may similarly be used for tracking device life cycle state. For example, the embodiments described can be used to identify whether the device is a new device, whether the device has been decommissioned, whether the device is refurbished, whether the device is missing, whether the device is at its end of life, etc. In other words, the embodiments described above may be used to track any information associated with the device.

Figure 5:
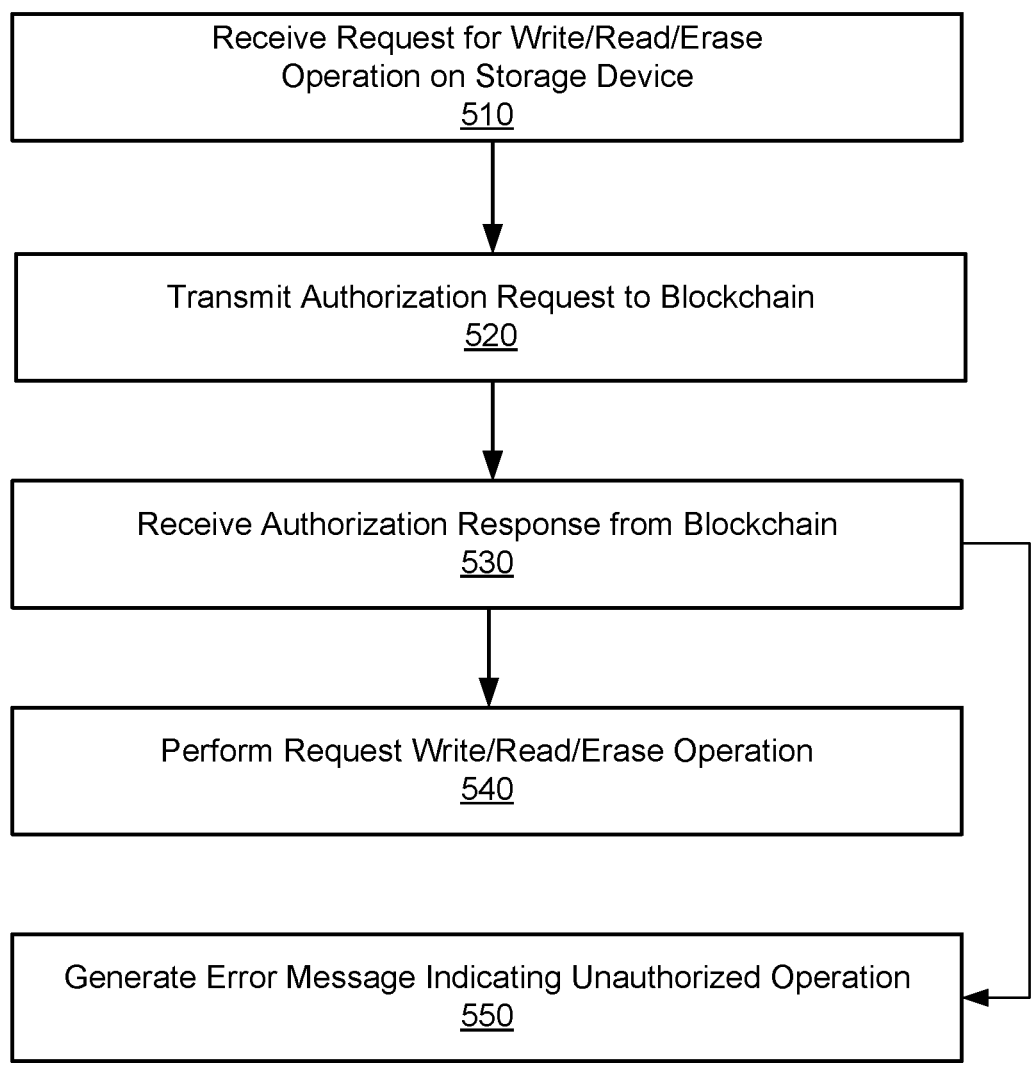
FIG. 5 shows a method of verifying one or more operations of the storage device using a private key maintained by an onboard computing device, in accordance with some embodiments.

In some embodiments, the onboard computing system 150 and the private key 160 are configured to verify operation requests received by the storage device 100 prior to execution of the operation requests. FIG. 5 illustrates an exemplary method for verifying device configuration operation requests prior to execution, in accordance with some embodiments. At step 510, the storage device 100 receives a request for firmware update, sector size adjustment, or any other device configuration change request. The request may be received from a system coupled to the storage device 100 and/or a remote system in signal communication with the storage device 100.

At step 520, the onboard computing system 150 intercepts the request and generates an authorization request to the blockchain (e.g., generates a query to one or more peers of the blockchain) to verify authorization for the requested device configuration operation. The authorization request may include a request to verify the specific operation, verify the user/system requesting the action, and/or performing any other verification. The authorization request is signed by the private key 160 stored on secure memory 156 and transmitted to one or more peers.

At step 530, the onboard computing system 150 receives a response from one or more peers indicating the authorization status of the requested device configuration operation. For example, in some embodiments, the onboard computing system 150 receives a list of authorized transactions and/or systems/users and determines whether the requested operation and/or requesting user are authorized. As another example, in some embodiments, the onboard computing system 150 receives a yes/no response indicating whether the operation and/or user are authorized. It will be appreciated that any suitable authorization response can be received and is within the scope of this disclosure. If the authorization response indicates that the requested operation is authorized, the method 500 proceeds to step 540, and the requested operation is performed on the storage device 100. Otherwise, the method 500 proceeds to step 550, and an error message indicating an authorized operation is generated.

Figure 6:
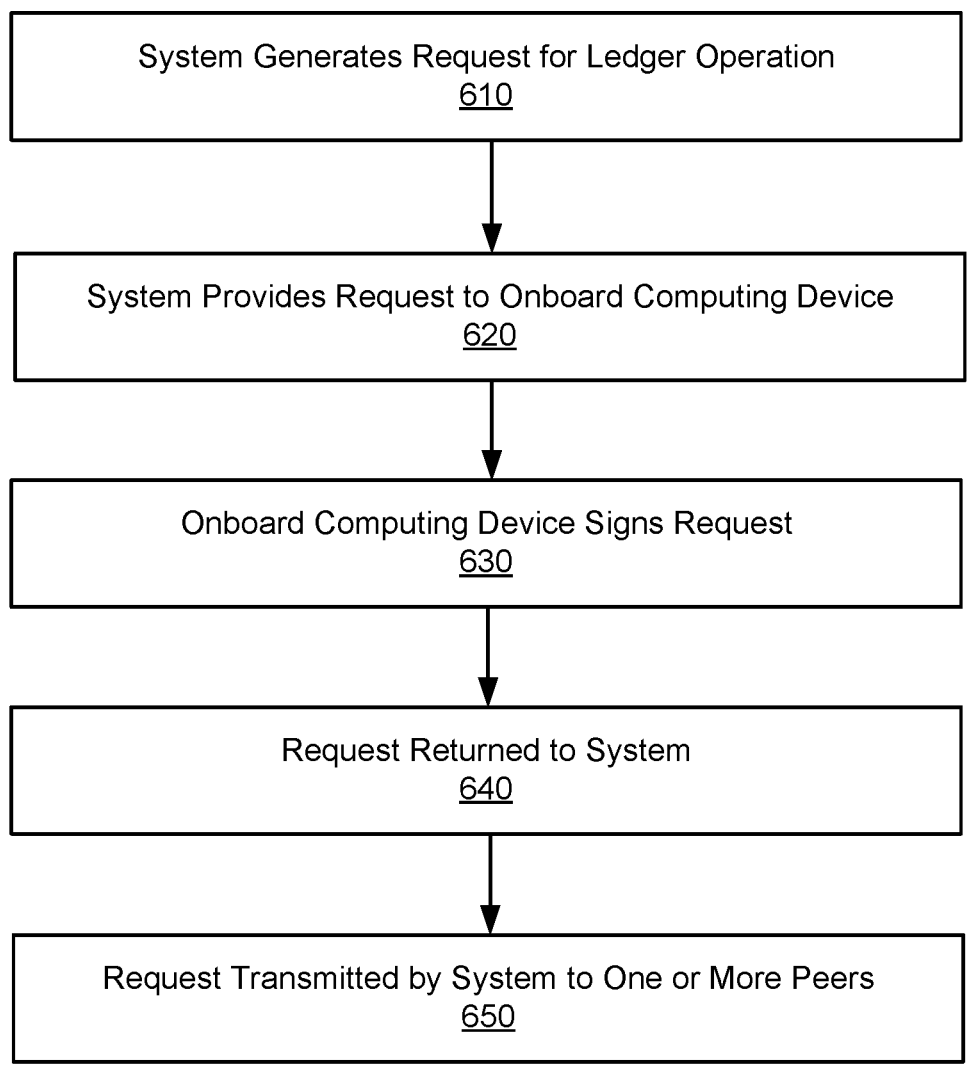
FIG. 6 shows a method of using a private key stored on a storage device to sign a request generated by a system containing the storage device, in accordance with some embodiments.

FIG. 6 shows a method of using a private key stored on a storage device to sign a request generated by a system containing the storage device, in accordance with some embodiments. At step 610, a system containing a storage device 100 generates a request for a ledger operation on the distributed ledger associated with the storage device 100. For example, in some embodiments, the system may update ownership, life-cycle state, and/or other information associated with the storage device 100. The request is recorded in a new block and appended to the blockchain.

At step 620, the system passes the request to the onboard computing system 150 of the storage device 100. The system may pass the complete request and/or data to have the device generate the request. At step 630, the onboard computing system 150 cryptographically signs the request using the private key 160 stored in secure memory 156. The onboard computing system 150 may sign the request using any suitable signature process as specified by the distributed ledger.

At step 640, the onboard computing system 150 returns the signed request to the system, which transmits the request to the distributed ledger at step 650. The request is processed by one or more peers as though issued by the storage device 100 itself, allowing the system to update the distributed ledger.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications or of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
receiving a first private key and associated certificate from an issuing authority associated with a distributed ledger;
storing the first private key on a secure memory of a storage device;
accessing the first private key to enable the storage device to participate in a distributed ledger;
signing a block of a blockchain associated with the distributed ledger with a second private key, wherein the block is associated with an operation of the distributed ledger, and the second private key having been stored on the secure memory at a time of manufacturing the storage device, and the signing being performed by an onboard computing device of the storage device having the secure memory integrated therein; and
validating the storage device by the storage device via the distributed ledger when the storage device is activated within a system in which the storage device is used, wherein the validation detects at least one of errors or tampering with the storage device.

2. The method of claim 1, wherein the second private key is generated by the storage device and its associated public key certificate is issued by a certificate issuing authority.

3. The method of claim 1, wherein the onboard computing device validates the distributed ledger independently of the system.

4. The method of claim 3, wherein validating the storage device comprises:
generating a request to the distributed ledger for first device information associated with the storage device stored on the distributed ledger, wherein the request is cryptographically signed using the second private key;
obtaining second device information from the storage device; and
comparing the first device information to the second device information, wherein the storage device is validated when the first device information and the second device information is identical.

5. The method of claim 4, wherein the first and second device information comprise at least one of date of manufacture, serial number, model number, firmware revision number, and size of the storage device.

6. The method of claim 1, wherein the onboard computing device is configured to:
generate a request to update a device state information stored on the distributed ledger; and
verify the device state information stored on the distributed ledger after installation of the storage device within the system.

7. The method of claim 1, wherein the onboard computing device is configured to generate a request to authorize a storage device configuration operation, wherein the request is provided to the distributed ledger.

8. The method of claim 1, wherein the storage device comprises one of a hard disk drive or a solid-state drive.

9. The method of claim 1, wherein the storage device comprises a communications module operable to transmit and receive updates to and from the distributed ledger via a network.

10. The method of claim 1, further comprising a communications module operable to transmit and receive updates to and from the distributed ledger via a network.

11. A storage device comprising:
a storage portion; and
an onboard computing device, comprising:
a processor;
a memory module in signal communication with the processor, wherein the memory module includes a first private key associated with a distributed ledger, the memory module including a second private key associated with the storage device, the second private key being unique to the storage device and the second private key being stored on the memory module at a time of manufacturing the storage device; and a communication module in signal communication with the processor and a network from which the distributed ledger is accessed, the first private key being used to enable the storage device to participate in the distributed ledger and the second private key being used to sign a block of a blockchain associated with the distributed ledger, wherein the processor is operable to validate the storage device via the distributed ledger when the storage device is activated within a system in which the storage device is used, wherein the validation detects at least one of errors or tampering with the storage device and is independent of the system.

12. The storage device of claim 11, wherein the memory module comprises a secure memory that is isolated from system in which the storage device is installed, and wherein the second private key is maintained by the secure memory.

13. The storage device of claim 11, wherein the first private is generated by an issuing system, and wherein the issuing system is configured to generate a certificate with the first private key and further configured to securely transmit the certificate and private key to the storage device via the communication module.

14. The storage device of claim 11, wherein the onboard computing device is configured to, independently of the system:
generate a request to the distributed ledger for first device information associated with the storage device stored on the distributed ledger, wherein the request is cryptographically signed using the second private key;
obtain second device information from the storage device; and
compare the first device information to the second device information, wherein the storage device is validated when the first device information and the second device information is identical.

15. The storage device of claim 14, wherein the first and second device information comprise at least one of date of manufacture, serial number, model number, firmware revision number, and size of the storage device.

16. The storage device of claim 11, wherein the onboard computing device is configured to:
generate a request to update device state information stored on the distributed ledger; and
verify the device state information stored on the distributed ledger after installation of the storage device within the system.

17. The storage device of claim 11, wherein the onboard computing device is configured to generate a request to authorize a storage device configuration operation, wherein the request is provided to the distributed ledger.

18. The storage device of claim 11, wherein the storage device comprises one of a hard disk drive or a solid-state drive.

19. A method comprising:
generating a first private key and associated certificate from an issuing authority associated with a distributed ledger, the first private key being generated by an issuing system;
storing the first private key on a secure memory of a storage device; and
signing one or more ledger operations using a second private key that is unique to the storage device, the signing being performed by an onboard computing device of the storage device, the second private key being different from the first private key and generated by the storage device;
updating the distributed ledger to include first device information related to ownership of the storage device, wherein the updating is performed by the storage device independently of a system in which the storage device is used; and
validating the storage device by the onboard computing device of the storage device via the distributed ledger when the storage device is activated within the system, wherein the validation detects at least one of errors or tampering with the storage device.

20. The method of claim 19, wherein validating the storage device comprises:
generating a request to the distributed ledger for the first device information, wherein the request is cryptographically signed using the second private key;
obtaining second device information from the storage device; and
comparing the first device information to the second device information, wherein the storage device is validated when the first device information and the second device information is identical.

21. The method of claim 19, wherein the storage device comprises one of a hard disk drive or a solid-state drive.

* * * * *